US012681819B2

(12) United States Patent
Koothapaakkam et al.

(10) Patent No.: US 12,681,819 B2
(45) Date of Patent: Jul. 14, 2026

(54) DATA PROCESSING

(71) Applicant: Arm Limited, Cambridge (GB)

(72) Inventors: Madhusudhan Rajagopalan Koothapaakkam, Bangalore (IN); Aneesh Garg, Bangalore (IN); Hrishikesh Sathyavasu Murukkathampoondi, Bangalore (IN); Deepak Venkatesan, Bangalore (IN); Rashmin Mantri, Bangalore (IN); Nitin Gupta, Bangalore (IN); Sahana, Bangalore (IN)

(73) Assignee: ARM LIMITED, Cambridge (GB)

( * ) Notice: Subject to any disclaimer, the term of this patent is extended or adjusted under 35 U.S.C. 154(b) by 429 days.

(21) Appl. No.: 16/445,785

(22) Filed: Jun. 19, 2019

(65) Prior Publication Data

US 2020/0026629 A1 Jan. 23, 2020

(30) Foreign Application Priority Data

Jul. 23, 2018 (GB) ...................................... 1811967

(51) Int. Cl.
*G06F 11/00* (2006.01)
*G06F 11/22* (2006.01)
*G06F 11/26* (2006.01)
*G06F 13/40* (2006.01)

(52) U.S. Cl.
CPC .......... *G06F 11/26* (2013.01); *G06F 11/2236* (2013.01); *G06F 13/4027* (2013.01)

(58) Field of Classification Search
CPC ............. G05B 19/0428; G06F 11/1629; G06F 11/0796; G06F 11/1641; G06F 2201/865; G06F 11/26; G06F 11/2236; G06F 13/4027
See application file for complete search history.

(56) References Cited

U.S. PATENT DOCUMENTS

| | | | | | |
|---|---|---|---|---|---|
| 4,933,941 | A | * | 6/1990 | Eckard | ................ G06F 11/2736 714/E11.166 |
| 5,339,261 | A | * | 8/1994 | Adelson | .............. G06F 11/0796 714/45 |

(Continued)

OTHER PUBLICATIONS

Examination Report for GB Application No. 1811967.7 dated Oct. 2, 2020, 3 pages.

(Continued)

*Primary Examiner* — Loan L. T. Truong
(74) *Attorney, Agent, or Firm* — Nixon & Vanderhye, PC

(57) ABSTRACT

Data processing apparatus comprises a processing module to initiate data handling transactions, for transmission to a data handling module by a transaction interface, in response to successive processing instructions; a verification module connectable to the transaction interface and configured to detect test data, representing an ordered series of communications via the transaction interface generated in response to a test series of processing instructions; in which the verification module is configured to compare two or more instances of the test data generated in response to the same test series of processing instructions and to detect whether the two or more instances of the test data are identical.

19 Claims, 9 Drawing Sheets

(56) References Cited

U.S. PATENT DOCUMENTS

| 5,553,237 | A | * | 9/1996 | Eisenberg | G06F 11/0751 714/26 |
| 6,223,272 | B1 | * | 4/2001 | Coehlo | G06F 30/33 712/1 |
| 6,438,722 | B1 | * | 8/2002 | Bailey | G01R 31/319 714/736 |
| 6,487,700 | B1 | * | 11/2002 | Fukushima | G01R 31/31705 716/106 |
| 6,651,201 | B1 | * | 11/2003 | Adams | G01R 31/2891 714/733 |
| 7,228,390 | B2 | * | 6/2007 | Rischar | G05B 19/0428 700/18 |
| 7,685,487 | B1 | * | 3/2010 | Kuo | G01R 31/318563 714/726 |
| 8,136,065 | B2 | * | 3/2012 | Huang | G06F 30/331 716/136 |
| 8,332,201 | B1 | * | 12/2012 | Briggs | G06F 11/26 703/15 |
| 8,645,897 | B1 | * | 2/2014 | Nandini | G06F 30/33 716/136 |
| 9,672,094 | B1 | * | 6/2017 | Nitzan | G06F 11/221 |
| 9,690,602 | B2 | * | 6/2017 | Abraham | G06F 9/44589 |
| 2002/0120632 | A1 | * | 8/2002 | Gremmert | G06F 16/29 |
| 2002/0162050 | A1 | * | 10/2002 | Milojicic | G06F 11/141 714/E11.116 |
| 2002/0193980 | A1 | * | 12/2002 | Higashi | G01R 31/31705 703/26 |
| 2004/0210798 | A1 | * | 10/2004 | Higashi | G01R 31/31907 714/27 |
| 2004/0261078 | A1 | * | 12/2004 | Abou-Emara | G06F 9/52 718/107 |
| 2005/0188275 | A1 | * | 8/2005 | Maly | G06F 11/261 714/39 |
| 2006/0052997 | A1 | * | 3/2006 | Burns | G06F 11/366 703/22 |
| 2006/0195208 | A1 | * | 8/2006 | Sammer | G06F 11/006 700/109 |
| 2008/0222397 | A1 | * | 9/2008 | Wilkerson | G06F 12/145 712/E9.016 |
| 2009/0094429 | A1 | * | 4/2009 | Boule | G06F 12/1441 711/163 |
| 2010/0070943 | A1 | * | 3/2010 | Koga | G06F 30/30 716/104 |
| 2011/0145664 | A1 | * | 6/2011 | Akita | G11C 29/56 714/720 |
| 2013/0044604 | A1 | * | 2/2013 | Hatley | H04L 47/623 370/241 |
| 2015/0046752 | A1 | * | 2/2015 | Cain, III | G06F 11/362 714/38.1 |
| 2015/0046758 | A1 | * | 2/2015 | Cain, III | G06F 11/181 714/49 |
| 2015/0067278 | A1 | * | 3/2015 | Gurumurthi | G06F 12/0811 711/154 |
| 2016/0092331 | A1 | * | 3/2016 | Cain, III | G06F 11/181 714/37 |
| 2016/0147639 | A1 | * | 5/2016 | Cain, III | G06F 11/3668 714/15 |
| 2017/0123951 | A1 | * | 5/2017 | Abdirashid | G06F 11/2221 |
| 2018/0329397 | A1 | * | 11/2018 | Izzo | G05B 19/4184 |
| 2019/0108045 | A1 | * | 4/2019 | Lee | G06F 11/3608 |
| 2019/0163596 | A1 | * | 5/2019 | Eckert | G06F 11/221 |
| 2019/0278677 | A1 | * | 9/2019 | Terechko | G06F 11/27 |

OTHER PUBLICATIONS

Combined Search Report and Abbreviated Examination Report for GB1811967.7, Jan. 30, 2019, 6 pages.
Examination Report for GB Application No. 1811967.7 dated Feb. 18, 2021, 3 pages.
Examination Report for GB Application No. 1811967.7 dated Jun. 9, 2021, 3 pages.

* cited by examiner

| Name | Reset value | Description |
|---|---|---|
| Check Select Register | 0 | 0 - Disable all checks<br>1- Check memory transaction ordering<br>    (Reordering is not permitted)<br>2 - Check memory transaction merging<br>    (Merging is not permitted}<br>3 - Check both ordering and merging<br>    (Both reordering and merging are not permitted) |
| Error Flag Register | 0 | This register is updated by the VIP to indicate a violation in the ordering or merging rules<br>0 - No error<br>1 - Error in comparison |
| Run Select Register | 0 | This register is read by the VIP to check if the memory transactions are from RUN1 or RUN2<br>0 - RUN1<br>1 - RUN2 |
| Software Reset Register | 0 | When this register is set, all control registers and internal registers in the VIP are reset to 0 |
| Test Complete Register | 0 | When this register is set, the software indicates to the VIP that both RUN1 and RUN2 are complete. |

FIG. 4

| Name | Type | Description |
|---|---|---|
| MEMORY [index] | Register Array | This is a storage array in which the details of each memory read-write transaction are stored |
| RUN1_read_counter | Register | Counts the number of read transactions in RUN1 |
| RUN1_write_counter | Register | Counts the number of write transactions in RUN1 |
| RUN2_read_counter | Register | Counts the number of read transactions in RUN2 |
| RUN2_ write _counter | Register | Counts the number of write transactions in RUN2 |
| ERROR_ordering | Register | This is set when a mismatch is detected between RUN1 and RUN2 data stored in the array |
| ERROR_merging | Register | This is set when a mismatch is detected between the read and write counters for RUN1 and RUN2 |

FIG. 5

DATA PROCESSING

This application claims priority to GB Patent Application No. 1811967.7 filed 23 Jul. 2018, the entire contents of which is hereby incorporated by reference.

BACKGROUND

This disclosure relates to data processing.

Some data processing arrangements make use of so-called transaction handling protocols make use of identifiers associated with data processing transactions, so that an initiator device (which initiates a transaction) can await a response to a transaction and, when the response arrives from a transaction server device, can handle the response appropriately.

The ordering in which transactions are handled is important. Some processing modules can re-order and/or merge transactions, and rules may be put in place to prevent or inhibit this.

SUMMARY

In an example arrangement there is provided data processing apparatus comprising:

a processing module to initiate data handling transactions, for transmission to a data handling module by a transaction interface, in response to successive processing instructions;

a verification module connectable to the transaction interface and configured to detect test data representing an ordered series of communications via the transaction interface generated in response to a test series of processing instructions;

in which the verification module is configured to compare two or more instances of the test data generated in response to the same test series of processing instructions and to detect whether the two or more instances of the test data are identical.

In another example arrangement there is provided a computer program for controlling a host data processing apparatus to provide a simulation environment comprising:

a processing module to initiate data handling transactions, for transmission to a data handling module by a transaction interface, in response to successive processing instructions;

a verification module connectable to the transaction interface and configured to detect test data representing an ordered series of communications via the transaction interface generated in response to a test series of processing instructions;

in which the verification module is configured to compare two or more instances of the test data generated in response to the same test series of processing instructions and to detect whether the two or more instances of the test data are identical.

In another example arrangement there is provided a system comprising:

an integrated circuit providing circuitry to implement a hardware processing module to initiate data handling transactions, for transmission to a data handling module by a hardware transaction interface, in response to successive processing instructions, and a hardware verification module connectable to the hardware transaction interface and configured to detect hardware test data representing an ordered series of communications via the hardware transaction interface generated in response to a test series of processing instructions;

a computer program for controlling a host data processing apparatus to provide a simulation environment comprising an emulated processing module to initiate data handling transactions, for transmission to a data handling module by an emulated transaction interface, in response to successive processing instructions, and an emulated verification module connectable to the emulated transaction interface and configured to detect emulation test data representing an ordered series of communications via the emulated transaction interface generated in response to the test series of processing instructions;

in which one or both of the hardware verification module and the emulated verification module is configured to compare two or more instances of the test data generated in response to the same test series of processing instructions, at least one instance of the two or more instances being hardware test data and at least one instance of the two or more instances being emulation test data, and to detect whether the two or more instances of the test data are identical.

In another example arrangement there is provided a verification module for use in data processing apparatus comprising a processing module to initiate data handling transactions, for transmission to a data handling module by a transaction interface, in response to successive processing instructions;

in which the verification module is connectable to the transaction interface and configured to detect test data representing an ordered series of communications via the transaction interface generated in response to a test series of processing instructions;

in which the verification module is configured to compare two or more instances of the test data generated in response to the same test series of processing instructions and to detect whether the two or more instances of the test data are identical.

In another example arrangement there is provided a data processing method comprising:

a processing module initiating data handling transactions, for transmission to a data handling module by a transaction interface, in response to successive processing instructions;

detecting test data representing an ordered series of communications via the transaction interface generated in response to a test series of processing instructions;

comparing two or more instances of the test data generated in response to the same test series of processing instructions; and detecting whether the two or more instances of the test data are identical.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 4 and 5 schematically illustrate data structures;

DESCRIPTION OF EMBODIMENTS

Figure 1:
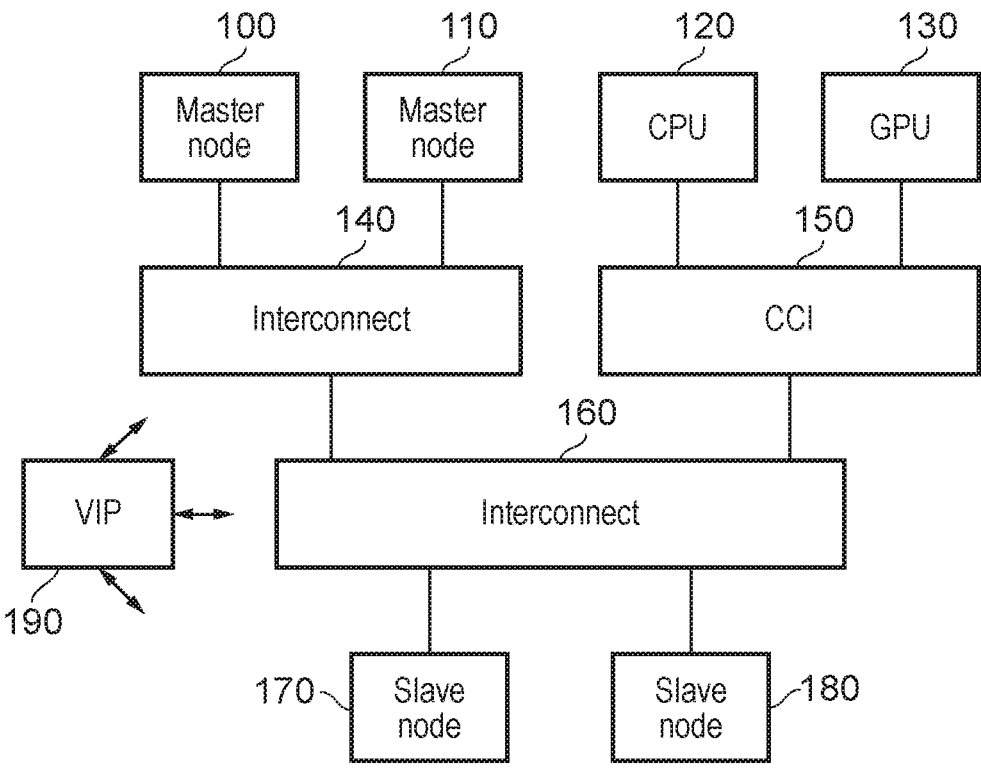
FIG. 1 schematically illustrates a data processing system.

Referring to the drawings, FIG. 1 schematically illustrates an example data processing system comprising a number of master or transaction-initiating devices (otherwise referred to as initiators) 100, 110, 120, 130. The initiators may be master nodes operating according to (for example) the AXI (Advanced Extensible Interface) protocol or the CHI (Co-herent Hub Interface) protocol.

In the example of FIG. 1, the initiators 100, 110 are connected to an interconnect 140, and the initiators 120, 130 are connected to a cache coherent interconnect 150.

The interconnect 140, 150 are connected via an intercon-nect 160 to various slave nodes 170, 180 such as a main memory, a dynamic memory controller which accesses a main memory, or the like.

The data processing apparatus of FIG. 1 can be imple-mented as a so-called system on chip (SoC) or network on chip (NoC) system. Relevant aspects of the design and fabrication of such an arrangement will be discussed briefly below.

In operation, the initiators 100 . . . 130 issue so-called transaction requests relating to data handling operations. An example of a transaction request is a request to read data from a particular memory address or range of memory addresses. Another example is a request to write data to a memory address or a range of memory addresses. Other transaction requests may relate to matters such as invalidat-ing a copy of certain data held at a particular node in the apparatus, or the like.

The initiators associate a transaction identifier with each transaction. In some instances, the transaction identifier can be "unique". The term "unique" does not necessary imply uniqueness across the whole apparatus, nor does it imply uniqueness across the whole of time. Instead, uniqueness can be defined as there being just one currently pending transaction from that particular initiator having that identi-fier. So, an identifier can be unique even though another initiator uses the same identifier, and an identifier can still be considered unique despite being used multiple times by the same initiator, if there is only one currently pending trans-action with that identifier, which is to say, once the trans-action with a particular identifier has been completed and its completion has been acknowledged back to the initiator, the same identifier can be used in a subsequent transaction without compromising its unique status.

A data processing transaction issued by an initiator is delivered, via the various interconnects, to a destination such as one of the slave nodes 170, 180. There, the data handling relating to the transaction is performed and an appropriate response sent to the initiator of that transaction. At the end of processing relating to a transaction, a completion acknowledgement can be sent to the initiator. So an indi-vidual transaction can give rise to a succession of data traffic via a transaction interface, including for example: the transmission of the transaction, optionally an acknowledgement of that transmission, the transmission of a response to the transaction and/or the transmission of a completion indica-tion relating to that transaction.

CHI initiators are bound, by the CHI protocol, always to use unique identifiers as defined above. However, AXI initiators can use either unique identifiers or can issue a set of two or more transactions having the same identifier. Such an arrangement is allowed within the AXI and various other transaction handling protocols. A condition applied to such a set of transactions sharing an identifier, however, is that, for each of the set of transaction requests having the same identifier, operations such as delivery, response and comple-tion of the transactions must be performed in the order of issue of that set of transactions.

In the apparatus of FIG. 1, the CPU 120 (or indeed any of the nodes 100, 110, 120, 130) provides an example of a processing module to initiate data handling transactions, for transmission to a data handling module by a transaction interface, in response to successive processing instructions.

Note that a transaction handling device can be a slave device. But more generally it is any device downstream (in terms of the flow of data relating to the initiation of the transaction) of the initiator. So, an interconnect, or a part of an interconnect, can be a transaction handling device.

FIG. 1 also illustrates a verification module 190 which, in the present example, is in the form of a "verification IP module".

In a typical network on chip (NoC) or system on chip (SoC) device, multiple so-called IP blocks 300 are con-nected to one another to provide a network of such blocks. In this example, an "IP block" is a unit of circuitry with particular functionality, which typically (though not neces-sarily) represents the intellectual property or IP of a single party. Commonly, in integrated circuit design, these so-called IP blocks are treated as units within the integrated circuit design process, even though an IP block may itself comprise very many gates, transistors or other components in its own right. Note however that the term "IP block" is used here in a generic illustrative sense; an IP block is simply a functional block with the capability of communi-cating data with other such functional blocks. Similarly, although the term "IP block" implies ownership of rights in the module design, the present disclosure is not limited to any particular ownership arrangement.

The term "verification IP" or "verification IP module" implies the use of such a block or module which can be inserted as a subsystem into a circuitry design for use in testing, verifying or debugging the circuitry design. Verifi-cation IP modules may (like some other IP modules) be pre-designed (and may even be separately purchasable) so that they can be added relatively simply to a circuitry design in this way. In FIG. 1, the verification module 190 can be configured (as a static part of the circuitry design, or dynamically, to be discussed below) to communicate with various interfaces within the apparatus of FIG. 1. The verification module 190 can also be configured to be enabled or disabled in its operation, so that the module can be incorporated into a design for verification (pre-manufacture or pre-marketing) testing of the circuitry, but optionally left in place but disabled so that it has no further effect on the operation of the circuitry.

A typical early stage in the design of a complex or expensive-to-fabricate circuit is to employ emulation or simulation of the circuit's functionality, timing and the like, before any physical circuitry is actually fabricated. Simula-tion or emulation in a virtualised environment will be discussed with reference to FIG. 9 below. Verification modules may be employed in testing of an emulation or simulation of the circuitry design, or in testing a fabricated circuit (a "DUT" or device under test), or both. Examples will be discussed below.

Figure 2:
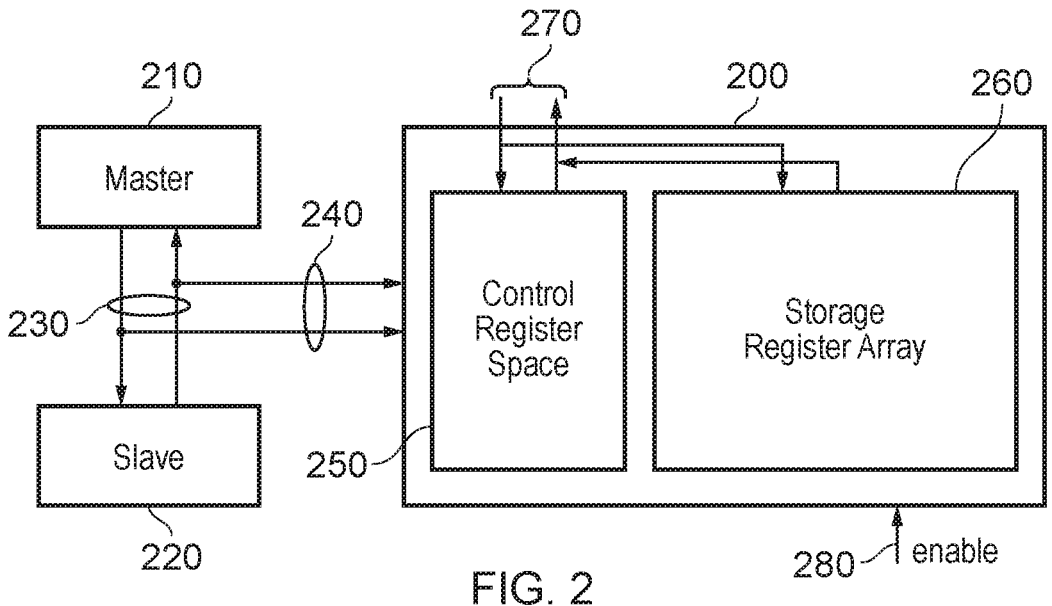
FIG. 2 schematically illustrates a verification module.

FIG. 2 schematically illustrates the use of a verification module 200 in the context of data communication involving data handling transactions between a master node 210 (for example, any of the master nodes discussed in connection with FIG. 1) and a slave node 220 or in other words a data handling module. So, the master node 210 initiates data handling transactions which are communicated or transmitted to the slave node as a data handling module by a transaction interface 230. In the case of a master node 210 initiating the transactions, this can be in response to successive processing instructions, for example executed by the CPU 120 and/or the GPU 130.

The verification module 200 is connectable via static or configurable connections 240 to the transaction interface 230 and can detect (as a sampling process, which does not itself affect the data being sampled) data passing via the transaction interface 230 representing successive communications using that interface. Under the control of parameters stored in a control register space 250, the data representing the sampled activity on the transaction interface 230 is stored in a storage register array 260. The control register space 250 and the storage register array 260 are accessible via a dedicated set of memory addresses which allow communication 270 between, for example, the CPU 120 and the module 200. Operation of the module 200 can also be under the control of an enable signal 280 for example controlled, in turn, by the CPU 120 (so that the processing module is configured to enable and disable the operation of the verification module); examples of the use of such a signal will be discussed further below.

Figure 3:
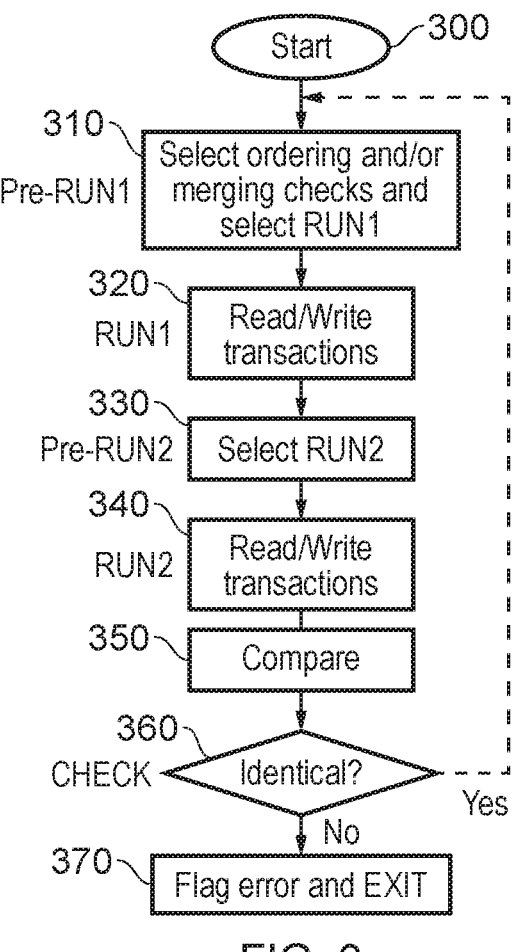
FIG. 3 is a schematic flowchart illustrating a method.

FIG. 3 is a schematic flow chart illustrating a method of usage of the arrangement of FIG. 2, in which the processing module is configured to execute the test series of processing instructions two or more successive times; and the verification module is configured to detect a respective instance of the test data corresponding to each time the test series of processing instructions is executed.

The process starts at a step 300. The process then involves multiple so-called "runs" each involving an execution, for example by the CPU 120, of a test series of processing instructions. At each run, the verification module 200 (connectable to the transaction interface 230 as mentioned above) is configured to detect test data representing an ordered series of communications via the transaction interface generated in response to the test series of processing instructions.

The verification module 200 may have its own circuitry or logic to initiate the "runs" and to compare the results (at the steps 350, 360) as discussed below. Or these functions can be carried out by, for example, the CPU 120. The test instructions can be generated by code running on the CPU 120, or by logic or circuitry of the verification module 200, or can be pre-stored by the verification module 200 for example. In examples, the processing module is configured to execute processing instructions to control operation of the verification module.

So, at a step 310, a first run, RUN1 is initiated, for example involving writing data to the control register space 250 to control aspects of the operation of the verification module 200, and then at a step 320 RUN1 is performed. The test series of processing instructions is executed and the verification module 200 detects data communication activity at the transaction interface 230.

At a step 330, a subsequent run, RUN2 in this example, is initiated and is performed at a step 340, again involving execution of the same test series of processing instructions. At a step 350, the sampled data acquired during RUN1 and RUN2 are compared. In this way, the verification module is configured to compare two or more instances of the test data generated in response to the same test series of processing instructions.

At a step 360, a detection is made as to whether the two or more instances of the test data are identical. If the answer is no then the process continues to a step 370 at which an error is flagged and the verification process exits. If the answer is yes then optionally control returns to the step 310 at which further runs can be carried out and/or different interfaces can be tested using the same techniques.

FIG. 4 schematically illustrates an example of the contents of the control register space 250, which relates primarily to parameters of the verification process being carried out and the current status of that process (for example, whether RUN1, RUN2 or another RUN is currently being executed).

FIG. 5 schematically illustrates the contents of the storage register array 260 which relates to specific attributes of the test runs being performed. With regard to the MEMORY [index] area, in example arrangements each data handling transaction has an associated transaction identifier; and the verification module is configured to detect transaction identifiers (and store them in this area) as part of the test data.

Figure 6:
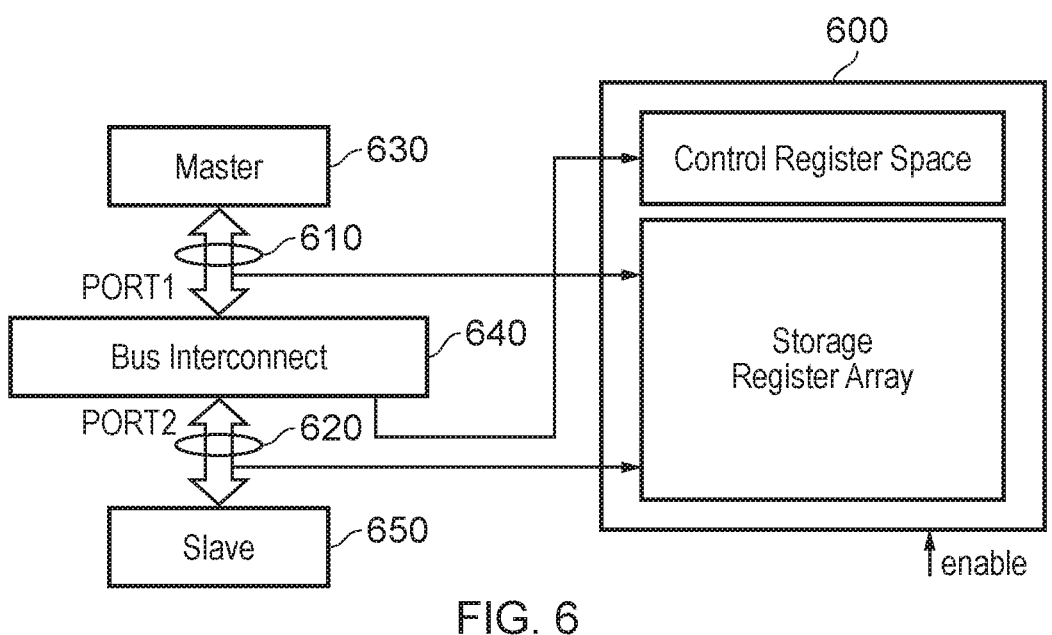
FIG. 6 schematically illustrates another mode of operation of a verification module.

FIG. 6 schematically illustrates another example use of a verification module 600 similar to the module 200 discussed above, except that in this example, instead of executing two successive runs and detecting discrepancies at the same interface, the arrangement is used to sample data transactions passing through first 610 and second 620 transaction interfaces, for example between a master node 630 and an interconnect 640 and between the interconnect 640 and a slave node 650. In instances where both interfaces are part of a direct data path between the master node and the slave node, the transaction data at the interfaces 610, 620 should correspond and should occur in the same order in each instance. It may be that there is a delay (corresponding to a transmission or other operational delay of the interconnect 640) of perhaps a few cycles, but this can be taken into account in the comparison (a step 740 below) in that the ordered sequences of data communications can be compared, rather than comparing on a clock-cycle by clock-cycle temporal basis.

Therefore, FIG. 6 provides an example in which the verification module 600 is connectable to two or more different transaction interfaces 610, 620 and is configured to detect a respective instance of the test data corresponding to each transaction interface of the two or more different transaction interfaces. For example, the system under test may provide an interconnect module 640 providing a data connection between the processing module and the data handling module, and in examples one 610 of the two or more transaction interfaces is an interface between the processing module and the interconnect module, and another 620 of the two or more transaction interfaces is an interface between the interconnect module and the data handling module.

Figure 7:
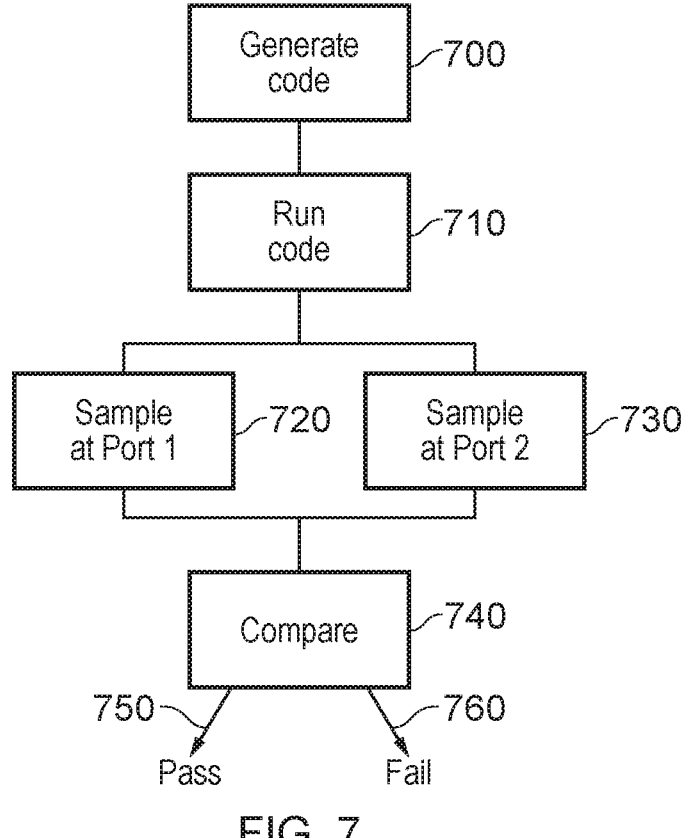
FIG. 7 is a schematic flowchart illustrating a method.

FIG. 7 is a schematic flow chart illustrating a method of operation of the arrangement shown in FIG. 6.

The test series of processing instructions is generated (using one or more of the techniques discussed above) at a step 700. At a step 710 the CPU 120 or another processing element executes the test series of processing instructions.

At respective steps 720, 730, the verification module 600 samples data communications at the transaction interface 610 (PORT1) and the transaction interface 620 (PORT2). It will be appreciated that more than two ports could be simultaneously monitored in this way. At a step 740, the test data representing an ordered series of communications via the respective transaction interfaces are compared. If they are identical this leads to a pass outcome 750 and if they are not identical this leads to a fail outcome 760.

Figure 8:
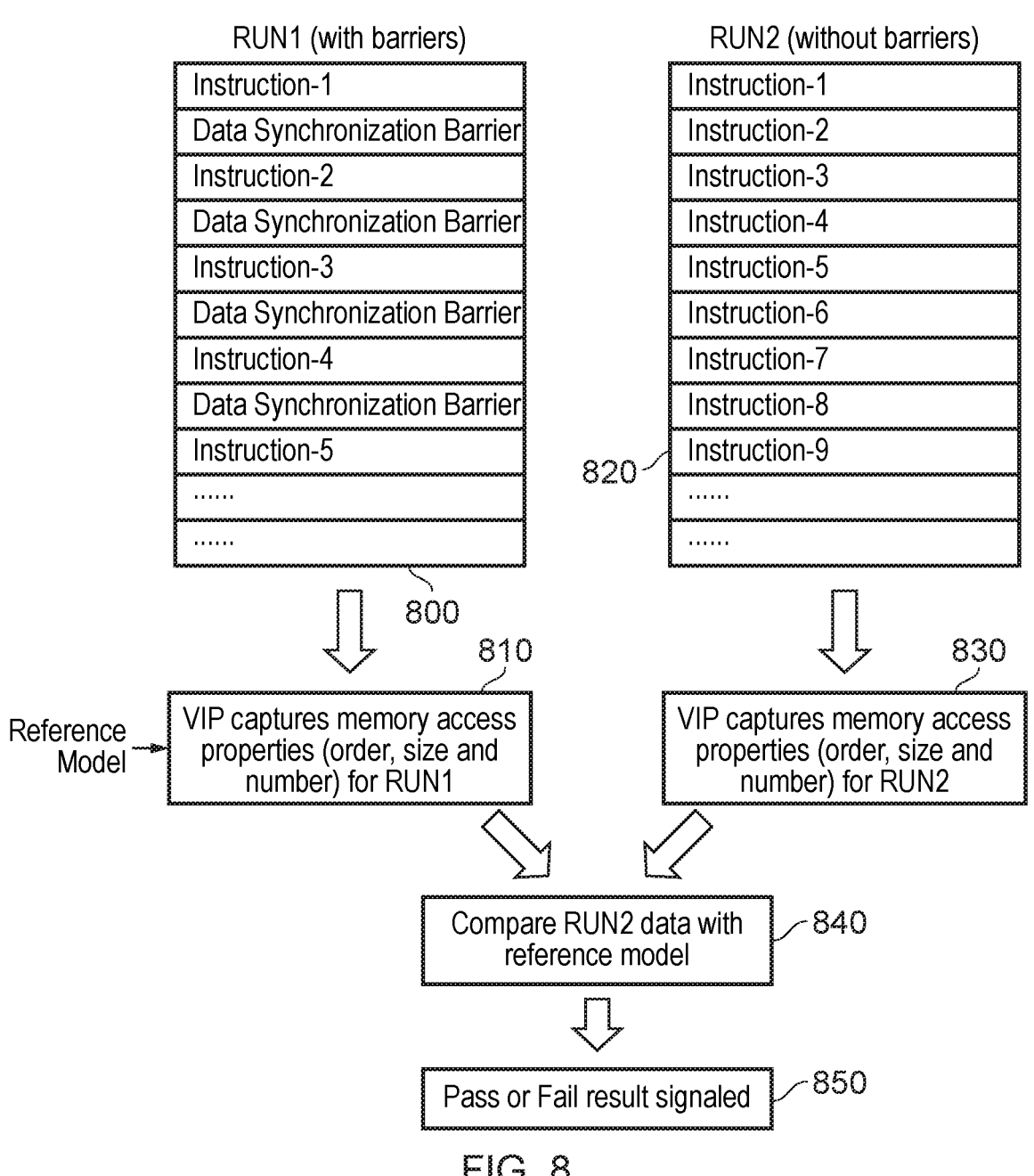
FIG. 8 schematically illustrates the use of so-called barrier instructions.

FIG. 8 schematically illustrates the use of so-called barrier instructions in an arrangement which is a modification of the process of FIG. 3 involving multiple successive runs. Here, at least one of the runs in which the test series of processing instructions is executed is performed with data synchronisation barrier instructions interspersed between instructions for initiating data handling transactions. In the examples shown, it is RUN1 which is performed with the barrier instructions and RUN2 which is performed without the barrier instructions, but this could be the other way round or a different arrangement could be used in a series of more than two runs.

The effect of a barrier instruction is to force the completion of any pending data handling transaction or transactions before the next instruction in the sequence of instructions can be executed. So as a result of RUN1 800, the verification module acquires test data representing an ordered series of communications on the respective transaction interface at a step 810, in such a way that all of the data handling communications for an individual transaction are completed before the next transaction is started. In this way, data handling operations relating to multiple transactions cannot be interspersed or reordered by either or both of the transaction initiator or the data handling devices. This generates test data for a so-called reference model in which all transactions are completed in instruction order.

At RUN2 820, the verification module acquires at a step 830 the test data but in this case there are no constraints on the CPU 120 or the transaction handling devices to inhibit reordering or overlap of data handling operations.

At a step 840, the test data acquired from RUN2 is compared with the reference model test data acquired from RUN1 such that if they are identical a pass outcome is signalled and if they are not identical a fail outcome is signalled at a step 850.

Therefore the example of FIG. 8 is one in which the processing module is configured to execute a barrier instruction between initiation of each data handling transaction, for one instance of execution of the test series of processing instructions.

Therefore, some example arrangements can provide an integrated circuit or DUT having circuitry to provide data processing apparatus as discussed above (or indeed below).

Other example arrangements make use of simulation or emulation, involving for example a computer program for controlling a host data processing apparatus to provide an instruction execution environment comprising:

a processing module to initiate data handling transactions, for transmission to a data handling module by a transaction interface, in response to successive processing instructions;

a verification module connectable to the transaction interface and configured to detect test data representing an ordered series of communications via the transaction interface generated in response to a test series of processing instructions;

in which the verification module is configured to compare two or more instances of the test data generated in response to the same test series of processing instructions and to detect whether the two or more instances of the test data are identical.

Figure 9:
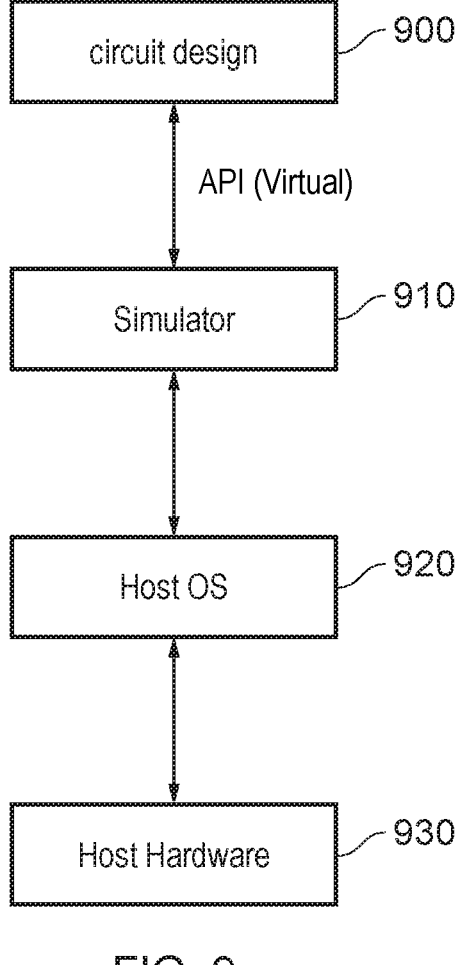
FIG. 9 schematically illustrates a virtualised environment.

FIG. 9 illustrates such a simulator implementation that may be used as part of the design process for an NoC, SoC or the like. Typically, a model of a proposed circuit is established using a hardware descriptor language such as Verilog, SystemVerilog or VHDL. The model can include IP modules or other modules such as the verification module discussed above. The model is executed by a simulator as a first stage of verification.

Such simulators can provide a software based implementation of a hardware architecture. It can be cheaper and easier to test a circuit design, in terms of its overall functionality, timing constraints, connectivity and the like, in this way rather than fabricating a DUT for initial testing. The process also allows variations in the design to be easily incorporated and tested.

Varieties of simulator computer programs include emulators, virtual machines, models, and binary translators, including dynamic binary translators. Typically, a simulator implementation may run on a host processor or hardware 930, optionally running a host operating system 920, supporting the simulator program 910. In some arrangements, there may be multiple layers of simulation between the hardware 930 and the circuit design 900, and/or multiple distinct simulation environments provided on the same host processor.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 930), some simulated embodiments may make use of the host hardware, where suitable.

The simulator program 910 may be stored on a computer-readable storage medium (which may be a non-transitory medium), and provides a program interface (simulation environment) to the target code 900 (which may include applications, operating systems and a hypervisor) which is the same as the application program interface of the hardware architecture being modelled by the simulator program 910. Thus, the circuit design 900, including the functionality of the verification module discussed above, may be executed from within the simulator program 910, so that a host computer 930 which does not actually have the hardware features of the circuitry discussed above can in fact emulate these features.

Figure 10:
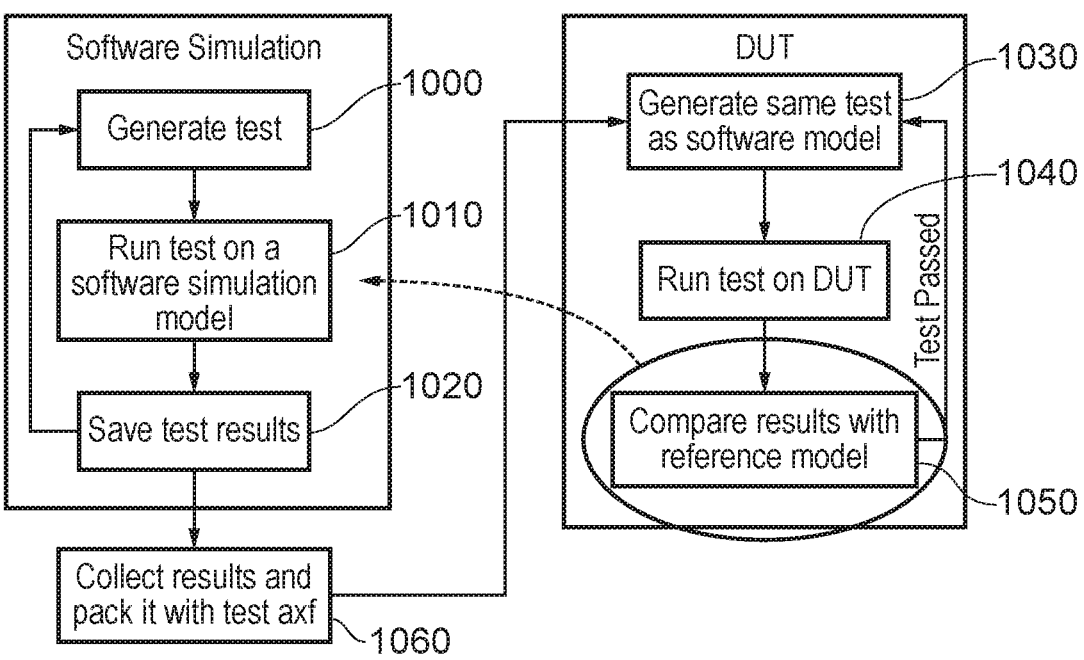
FIGS. 10 and 11 are schematic flowchart illustrating respective methods.

Using the emulation arrangement described with reference to FIG. 9, the results of a simulation or emulation of a circuitry design can be compared with results obtained from a physical DUT. This process is illustrated schematically in FIG. 10 in which, at a step 1000, a test series of processing instructions is generated. This is shown as being generated by, for example, software or program instructions running on the simulated processor, but could be carried out by software or program instructions running on the DUT or another processor. FIG. 10 therefore illustrates the use and operation of a system comprising:

an integrated circuit providing circuitry to implement a hardware processing module to initiate data handling transactions, for transmission to a data handling module by a hardware transaction interface, in response to successive processing instructions, and a hardware verification module connectable to the hardware transaction interface and configured to detect hardware test data representing an ordered series of communications via the hardware transaction interface generated in response to a test series of processing instructions;

a computer program for controlling a host data processing apparatus to provide an instruction execution environment comprising an emulated processing module to initiate data handling transactions, for transmission to a data handling module by an emulated transaction interface, in response to successive processing instructions, and an emulated verification module connectable to the emulated transaction interface and configured to detect emulation test data representing an ordered series of communications via the emulated transaction interface generated in response to the test series of processing instructions;

in which one or both of the hardware verification module and the emulated verification module is configured to compare two or more instances of the test data generated in response to the same test series of processing instructions, at least one instance of the two or more instances being hardware test data and at least one instance of the two or more instances being emulation test data, and to detect whether the two or more instances of the test data are identical.

In FIG. 10, at a step 1010 the test series of processing instructions is executed by the simulated CPU and the test results or test data obtained from this run are saved at a step 1020, for example to the storage array of the simulated verification module.

With regards to the DUT, the same test series of processing instructions is generated or obtained at a step 1030 and at a step 1040 the test instructions are run by the processor of the DUT. Then, at a step 1050, the test data results obtained on the DUT are compared with the results obtained on the simulation. Note that the step 1050 can be carried out by the DUT or by the software simulation or indeed both.

In order to carry out the test at the DUT, the test results obtained at the simulation are communicated at a step 1060 to the DUT. Of course, if the comparison step 1050 was carried out at the software simulation, a step corresponding to the step 1060 would be required to communicate test results from the DUT to the software simulation.

Figure 11:
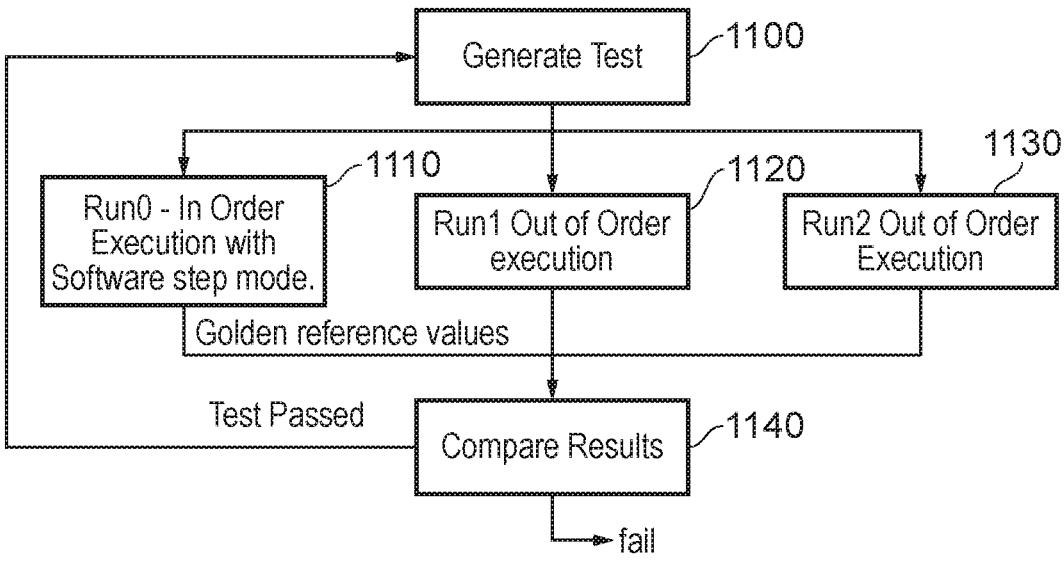

FIG. 11 is a schematic flow chart illustrating an example involving three test runs, one of which is carried out with the test series of processing instructions executed in a so-called single step mode. The use of a single step mode can force an in-order execution of the instructions and inhibit the processor such as the CPU 120 from reordering instructions for execution. The results obtained in the single step mode can be referred to as reference values for comparison with the non-single-step operations.

At a step 1100, the test series of processing instructions is generated and is then subject to three runs, RUN0 in single step mode at a step 1110, RUN1 1120 and RUN2 1130. As before the results are compared at a step 1140 leading to a pass or fail outcome.

Figure 12:
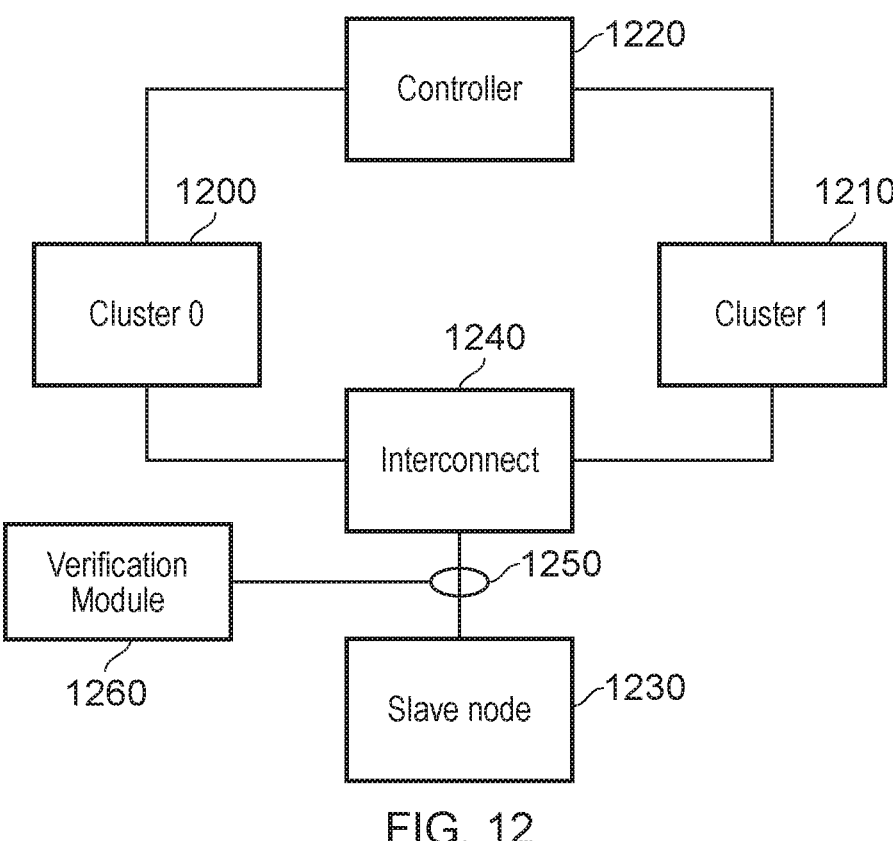
FIG. 12 schematically illustrates a system using hetero-geneous processors.

FIG. 12 schematically illustrates a system using heterogeneous processors, in which two processor clusters, CLUSTER0 1200 and CLUSTER1 1210 are arranged to execute program instructions alternately under the control of a controller 1220. The processors of CLUSTER0 and CLUSTER1 access the same memory address space of, for example a memory provided by a slave node 1230 connectable to the processor clusters by an interconnect 1240. In order to use the techniques discussed above, an interface such as the interface 1250 common to execution by both processor clusters can be sampled by a verification module 1260 as discussed above according to a flow chart schematically illustrating a method of operation in FIG. 13.

Therefore the processor clusters 1200, 1210 provide an example in which the processing module comprises a set of two or more processors configured to initiate data handling transactions which access a memory address space common to the set of two or more processors. In the examples below, the processing module is configured to execute the test series of processing instructions using a first subset of the set of two or more processors (CLUSTER0) and then to execute the test series of processing instructions using a second, different, subset (CLUSTER1) of the set of two or more processors. In some examples, the first and second subsets of the set of two or more processors have a common instruction set architecture (so that they can execute the same test instructions). Alternatively, a translation of the test instructions could be employed as between the clusters. However, in examples, the first and second subsets of the set of two or more processors have different respective data handling throughputs and different respective power consumptions. An example of such an arrangement is the so-called big. LITTLE architecture provided by Arm Limited.

Figure 13:
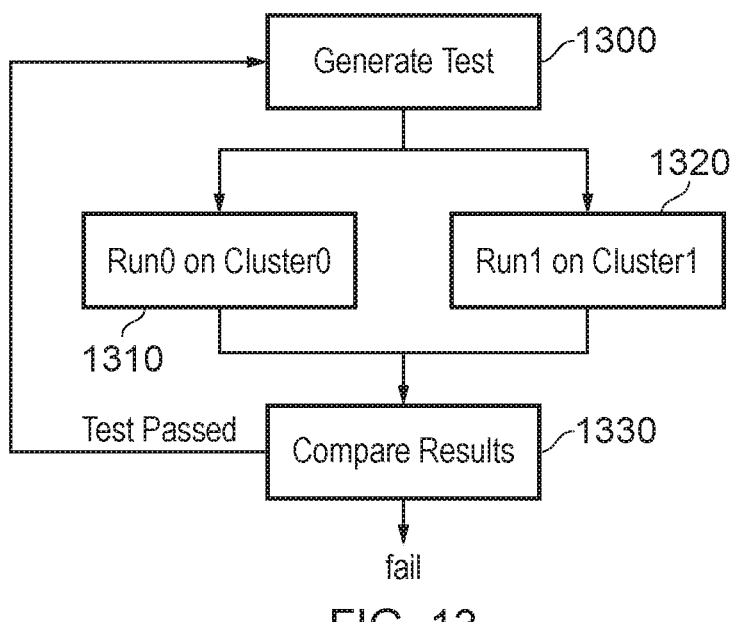
FIG. 13 is a schematic flowchart illustrating a method.

Referring to FIG. 13, at a step 1300 the test series of processing instructions is generated and is then subject to successive runs, RUN0 (1310 on CLUSTER0) and RUN 1 (1320 on CLUSTER1). As before the results are compared at a step 1330 leading to a pass or fail outcome depending on whether the instances of test data are identical.

Figure 14:
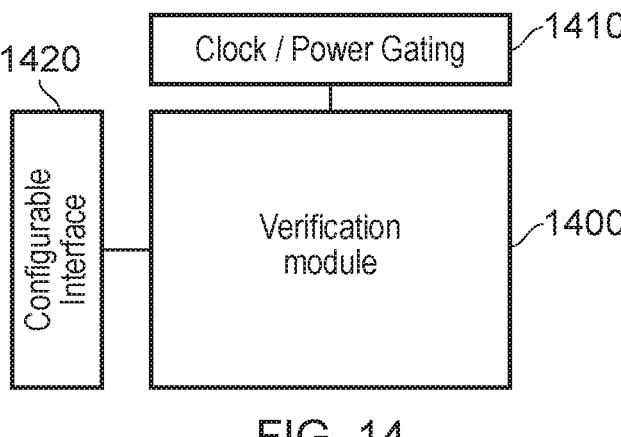
FIG. 14 schematically illustrates a verification module.

FIG. 14 schematically illustrates a verification module comprising circuitry 1400 connected to clock and/or power gating circuitry 1410 to enable or disable the operation of the verification module 1400 and a configurable interface 1420 allowing the verification module to be connected to various points within the circuitry of (for example) FIG. 1.

FIG. 14 therefore provides an example of a verification module for use in data processing apparatus comprising a processing module to initiate data handling transactions, for transmission to a data handling module by a transaction interface, in response to successive processing instructions;

in which the verification module is connectable to the transaction interface and configured to detect test data representing an ordered series of communications via the transaction interface generated in response to a test series of processing instructions;

in which the verification module is configured to compare two or more instances of the test data generated in response to the same test series of processing instructions and to detect whether the two or more instances of the test data are identical.

Figure 15:
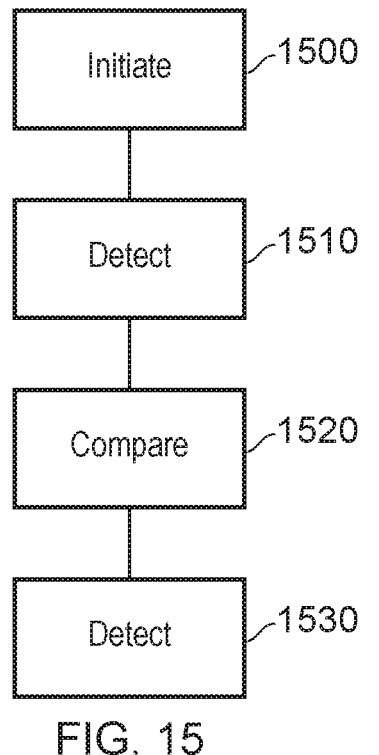
FIG. 15 is a schematic flowchart illustrating a method.

By way of summary of the description and various optional features outlined above, FIG. 15 is a schematic flowchart illustrating a data processing method comprising:

a processing module initiating (at a step 1500) data handling transactions, for transmission to a data handling module by a transaction interface, in response to successive processing instructions;

detecting (at a step 1510) test data representing an ordered series of communications via the transaction interface generated in response to a test series of processing instructions;

comparing (at a step 1520) two or more instances of the test data generated in response to the same test series of processing instructions; and detecting (at a step 1530) whether the two or more instances of the test data are identical.

The steps 1510, 1520 can be carried out, for example, by a verification module of the type discussed above. The step 1530 can be carried out by the processing module and/or the verification module.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:

circuitry implementing a hardware processing module configured to initiate data handling transactions, for transmission to a hardware data handling module via a transaction interface, in response to successive processing instructions; and a hardware verification module insertable as a subsystem into a circuitry design of the circuitry and connectable to the transaction interface and configured to detect, at the transaction interface, test data, representing an ordered series of communications from the hardware processing module to the hardware data handling module and from the hardware data handling module to the hardware processing module via the transaction interface generated in response to a test series of the processing instructions;

wherein the test data comprises memory access properties comprising an order and a number of the communications;

wherein the hardware verification module is configured to capture the memory access properties at the transaction interface; and wherein the hardware verification module is configured to compare two or more instances of the test data, to detect whether the two or more instances of the test data are identical, and to signal, in case that the two or more instances of the test data are identical, a pass outcome in the circuitry or, in case that the two or more instances of the test data are not identical, a fail outcome in the circuitry.

2. The apparatus according to claim 1, wherein the hardware processing module is configured to execute the test series of the processing instructions two or more successive times, and the hardware verification module is configured to detect a respective instance of the test data corresponding to each time the test series of the processing instructions is executed.

3. The apparatus according to claim 2, in which the hardware processing module comprises a set of two or more processors configured to initiate data handling transactions which access a memory address space common to the set of two or more processors.

4. The apparatus according to claim 3, in which the hardware processing module is configured to execute the test series of the processing instructions using a first subset of the set of two or more processors and then to execute the test series of the processing instructions using a second, different, subset of the set of two or more processors.

5. The apparatus according to claim 4, wherein the first and second subsets of the set of two or more processors have a common instruction set architecture.

6. The apparatus according to claim 4, wherein the first and second subsets of the set of two or more processors have different respective data handling throughputs and different respective power consumptions.

7. The apparatus according to claim 2, wherein the hardware processing module is configured to execute a barrier instruction between initiation of each data handling transaction, for one instance of execution of the test series of the processing instructions.

8. The apparatus according to claim 1, wherein the hardware verification module is connectable to two or more different transaction interfaces and is configured to detect a respective instance of the test data corresponding to each transaction interface of the two or more different transaction interfaces.

9. The apparatus according to claim 8, comprising a hardware interconnect module providing a data connection between the hardware processing module and the hardware data handling module.

10. The apparatus according to claim 9, wherein one of the two or more transaction interfaces is an interface between the hardware processing module and the hardware interconnect module, and another of the two or more transaction interfaces is an interface between the hardware interconnect module and the hardware data handling module.

11. The apparatus according to claim 1, wherein each data handling transaction has an associated transaction identifier, and the hardware verification module is configured to detect transaction identifiers as part of the test data.

12. The apparatus according to claim 1, wherein the hardware processing module is configured to execute processing instructions to control operation of the hardware verification module.

13. The apparatus according to claim 12, wherein the hardware processing module is configured to generate the test series of the processing instructions.

14. The apparatus according to claim 12, wherein the hardware processing module is configured to enable and disable the operation of the hardware verification module.

15. An integrated circuit comprising circuitry to provide the data processing apparatus according to claim 1.

16. A non-transitory computer-readable storage medium, storing a computer program for controlling a host data processing apparatus to provide a simulation environment, the computer program comprising:

a hardware processing module implementable in circuitry configured to initiate data handling transactions, for transmission to a data handling module via a transaction interface, in response to successive processing instructions; and a hardware verification module insertable as a subsystem into a circuitry design of the circuitry and connectable to the transaction interface and configured to detect, at the transaction interface, test data, representing an ordered series of communications from the hardware processing module to the hardware data handling module and from the hardware data handling module to the hardware processing module via the transaction interface generated in response to a test series of the processing instructions;

wherein the test data comprise memory access properties comprising an order and a number of the communications;

wherein the hardware verification module is configured to capture the memory access properties at the transaction interface; and wherein the hardware verification module is configured to compare two or more instances of the test data to detect whether the two or more instances of the test data are identical and to signal, in case that the two or more instances of the test data are identical, a pass outcome in the circuitry or, in case that the two or more instances of the test data are not identical, a fail outcome in the circuitry.

17. A system comprising:

an integrated circuit providing circuitry to implement a hardware processing module configured to initiate data handling transactions, for transmission to a data handling module via a hardware transaction interface, in response to successive processing instructions, and a hardware verification module insertable as a subsystem into a circuitry design of the circuitry and connectable to the hardware transaction interface and configured to detect, at the transaction interface, hardware test data representing an ordered series of communications from the hardware processing module to the hardware data handling module and from the hardware data handling module to the hardware processing module via the hardware transaction interface generated in response to a test series of processing instructions; and a computer program for controlling a host data processing apparatus to provide a simulation environment comprising an emulated processing module configured to initiate data handling transactions, for transmission to an emulated data handling module via an emulated transaction interface, in response to successive processing instructions, and an emulated verification module insertable as a subsystem into a circuitry design of the circuitry and connectable to the emulated transaction interface and configured to detect emulation test data, representing an ordered series of communications between the emulated processing module and the emulated handling module via the emulated transaction interface generated in response to the test series of the processing instructions;

wherein the test data comprise memory access properties comprising an order and a number of the communications;

wherein one or both of the hardware verification module and the emulated verification module are configured to capture the memory access properties at the transaction interface; and wherein one or both of the hardware verification module and the emulated verification module are configured to compare two or more instances of the test data, at least one instance of the two or more instances being hardware test data and at least one instance of the two or more instances being emulation test data, to detect whether the two or more instances of the test data are identical, and to signal, in case that the two or more instances of the test data are identical, a pass outcome in the circuitry or, in case that the two or more instances of the test data are not identical, a fail outcome in the circuitry.

18. A hardware verification module insertable as a subsystem into a circuitry design of a circuitry for use in a data processing apparatus comprising the circuitry implementing a hardware processing module configured to initiate data handling transactions, for transmission to a data handling module via a transaction interface, in response to successive processing instructions;

wherein the hardware verification module is connectable to the transaction interface and configured to detect, at the transaction interface, test data representing an ordered series of communications from the hardware processing module to the hardware data handling module and from the hardware data handling module to the hardware processing module via the transaction interface generated in response to a test series of the processing instructions;

wherein the test data comprise memory access properties comprising an order and a number of the communications;

wherein the hardware verification module is configured to capture the memory access properties at the transaction interface; and wherein the hardware verification module is configured to compare two or more instances of the test data, to detect whether the two or more instances of the test data are identical, and to signal, in case that the two or more instances of the test data are identical, a pass outcome in the circuitry or, in case that the two or more instances of the test data are not identical, a fail outcome in the circuitry.

19. A data processing method comprising:

providing a hardware processing module implementable or implemented in a circuitry configured to initiate data handling transactions, for transmission to a hardware data handling module via a transaction interface, in response to successive processing instructions;

using a hardware verification module insertable as a subsystem into a circuitry design of the circuitry for:

detecting, at the transaction interface, test data, representing an ordered series of communications from the hardware processing module to the hardware data handling module and from the hardware data handling module to the hardware processing module via the transaction interface generated in response to a test series of the processing instructions, wherein the test data comprise memory access properties comprising an order and a number of the communications;

capturing the memory access properties at the transaction interface;

comparing two or more instances of the test data;

detecting whether the two or more instances of the test data are identical; and signalling, in case that the two or more instances of the test data are identical, a pass outcome in the circuitry or, in case that the two or more instances of the test data are not identical, a fail outcome in the circuitry.

\* \* \* \* \*